United States Patent
MacPherson et al.

(10) Patent No.: US 7,296,152 B1
(45) Date of Patent: Nov. 13, 2007

(54) SYSTEM AND METHOD FOR PROVIDING ACCESS TO A NETWORK IN A COMMUNICATIONS ENVIRONMENT

(75) Inventors: Matthew S. MacPherson, Morrisville, NC (US); Godfrey Tan, Singapore (SG); Robert R. Sealey, Singapore (SG)

(73) Assignee: Cisco Technology, Inc., San Jose, CA (US)

( * ) Notice: Subject to any disclaimer, the term of this patent is extended or adjusted under 35 U.S.C. 154(b) by 925 days.

(21) Appl. No.: 10/192,244

(22) Filed: Jul. 9, 2002

(51) Int. Cl.
*H04L 9/00* (2006.01)

(52) U.S. Cl. .............. 713/168; 713/176; 713/185; 726/2; 726/20

(58) Field of Classification Search .............. 713/176, 713/168; 726/3, 2, 20
See application file for complete search history.

(56) References Cited

U.S. PATENT DOCUMENTS

| | | | |
|---|---|---|---|
| 5,905,736 A | 5/1999 | Ronen et al. | 370/546 |
| 5,956,391 A | 9/1999 | Melen et al. | 379/114 |
| 5,970,477 A | 10/1999 | Roden | 705/32 |
| 6,029,151 A * | 2/2000 | Nikander | 705/39 |
| 6,047,051 A | 4/2000 | Ginzboorg et al. | 379/130 |
| 6,230,012 B1 | 5/2001 | Willkie et al. | 455/435 |
| 2002/0059114 A1 | 5/2002 | Cockrill et al. | 705/27 |
| 2002/0147926 A1* | 10/2002 | Pecen et al. | 713/201 |

FOREIGN PATENT DOCUMENTS

| | | |
|---|---|---|
| WO | WO98/26381 | 12/1997 |
| WO | WO99/31610 | 12/1998 |

\* cited by examiner

*Primary Examiner*—Kambiz Zand
*Assistant Examiner*—Samson Lemma
(74) *Attorney, Agent, or Firm*—Baker Botts L.L.P.

(57) ABSTRACT

A method for authenticating an end user in a network environment is provided that includes positioning an identification element in a first device that is operable to provide an interface for an end user. The first device is further operable to communicate with an internet protocol (IP) network and with a second device. The end user is then authenticated with a selected one of the first and second devices through the IP network using the identification element such that the end user may operate the first and second devices in multiple access networks that cooperate to provide connectivity to the end user. Each of the access networks is operable to facilitate communications between the end user and the IP network.

28 Claims, 2 Drawing Sheets

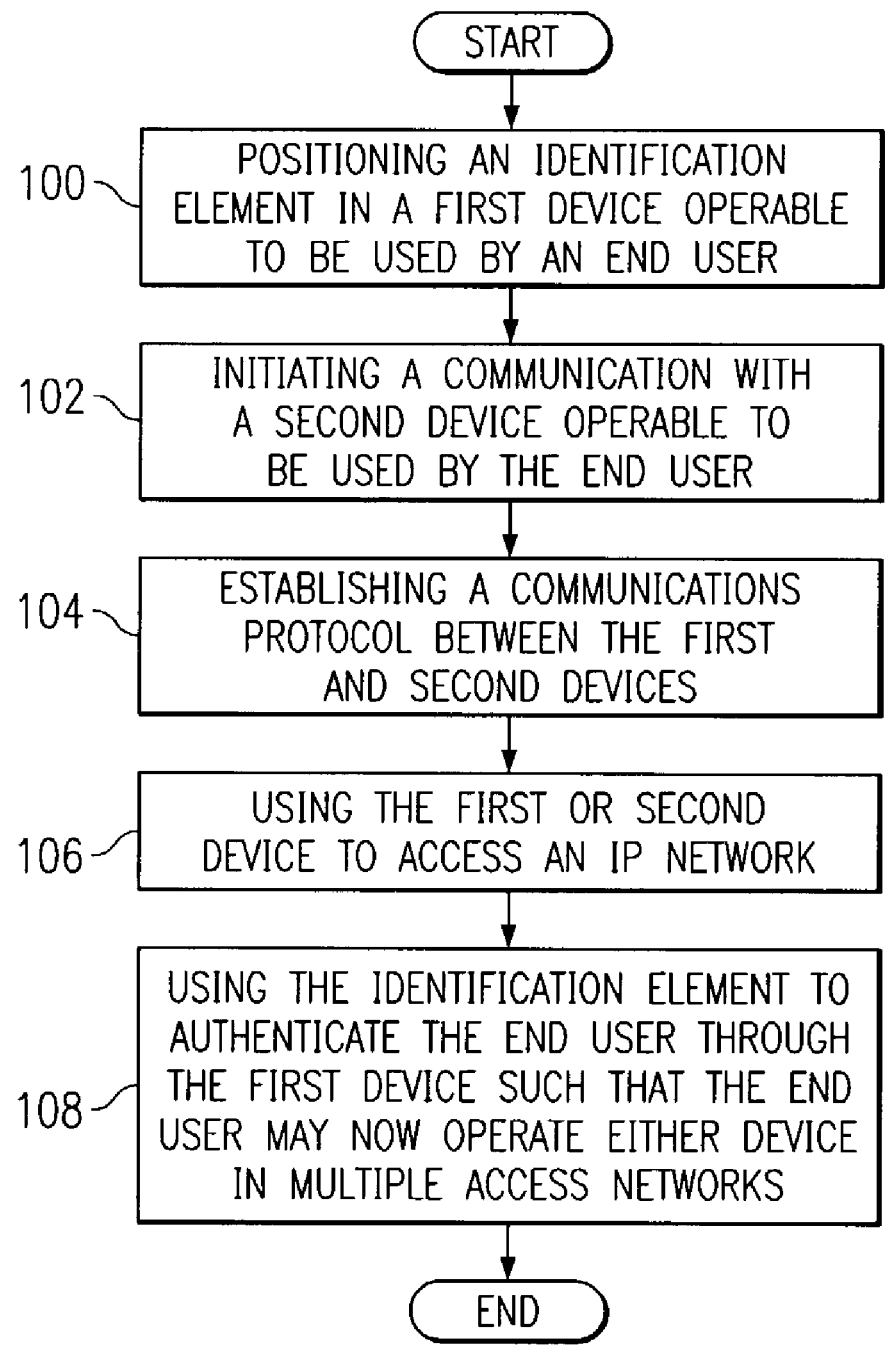

SYSTEM AND METHOD FOR PROVIDING ACCESS TO A NETWORK IN A COMMUNICATIONS ENVIRONMENT

TECHNICAL FIELD OF THE INVENTION

This invention relates in general to the field of communications and more particularly to a system and method for providing access to a network in a communications environment.

BACKGROUND OF THE INVENTION

The field of communications has become increasingly important in today's society. One area of importance associated with network communications relates to handover or redirection processes that involve individual devices using multiple access technologies. Handovers (or redirection of data pathways) generally occur in response to some geographic movement or some change in a network parameter that causes a corresponding device or component to require a switch from one access technology to another, such as between Ethernet and wireless local area networks (WLANs). When transitioning between various environments, it may be important to provide redirection capabilities that appear seamless to an end user, i.e. the communications between the device and a node in the network are generally uninterrupted. Re-authentication may occur when moving between the same or different access technologies. Additionally, the ability to properly authenticate multiple devices that may be assigned to a single user may also be beneficial in network environments, whereby the end user of the devices is not required to constantly re-authenticate or to verify his/her/its identity before using the device or initiating a communication.

SUMMARY OF THE INVENTION

From the foregoing, it may be appreciated by those skilled in the art that a need has arisen for an improved communications approach that provides the capability for devices or components to communicate with each other in order to properly authenticate selected devices such that an entity may move between multiple access networks in a seamless fashion while using the devices. In accordance with one embodiment of the present invention, a system and method for providing access to a network in a communications environment are provided that substantially eliminate or greatly reduce disadvantages and problems associated with conventional authenticating and accessing techniques.

According to one embodiment of the present invention, there is provided a method for authenticating an end user in a network environment that includes positioning an identification element in a first device that is operable to provide an interface for an end user. The first device is further operable to communicate with an internet protocol (IP) network and with a second device. The end user is then authenticated with a selected one of the first and second devices through the IP network using the identification element such that the end user may operate the first and second devices in multiple access networks that cooperate to provide connectivity to the end user. Each of the access networks is operable to facilitate communications between the end user and the IP network.

Certain embodiments of the present invention may provide a number of technical advantages. For example, according to one embodiment of the present invention a communications approach is provided that allows an operator to implement an identification element, such as a subscriber identification module (SIM) for example, in only one device to be used by an end user. The use of additional SIMs may be problematic in that multiple SIMs only create a greater security risk, as it is more likely that one of the SIMs will be lost. When a SIM is lost, anyone may be able to use the lost SIM in order to access the network using another end user's identity.

Another technical advantage of one embodiment of the present invention is a result of the decreased burden on component manufacturers in that multiple identification elements are not required to achieve effective authentication and access for an end user. The implementation of a single SIM significantly reduces costs for the manufacturer that may otherwise have to place a SIM in each device being used by an end user. A single SIM positioned in one device provides the ability for inter-communications between devices, whereby the use of a single identification element in one device operates to offer an authentication platform for multiple devices.

Yet another technical advantage of one embodiment of the present invention relates to the ability of an end user to roam between access networks while maintaining connectivity. The use of the SIM or of any other suitable identification element allows an end user to roam or move between various access technologies without dropping the communication session involving the end user. This provides for a seamless handover approach that offers an end user considerable flexibility in moving between the most optimal access technologies. Embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which:

FIG. 3 is a flowchart illustrating a series of steps associated with a method for providing access to a network in a communications environment.

DETAILED DESCRIPTION OF THE INVENTION

Figure 1:
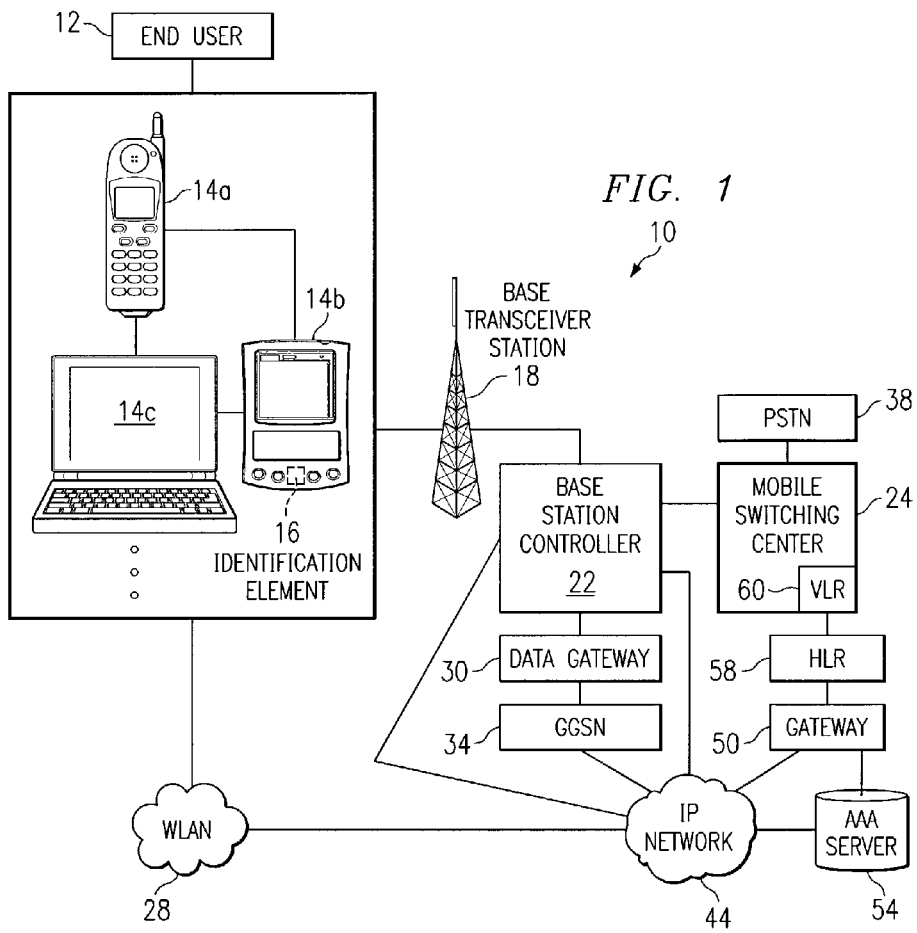
FIG. 1 is a simplified block diagram of a system for providing access to a network in a communications environment.

FIG. 1 is a simplified block diagram of a communication system 10 for authenticating an end user 12 (or an element associated therewith) in accordance with one embodiment of the present invention. Communication system 10 includes end user 12, an example set of communication elements that includes a mobile station 14a, a personal digital assistant (PDA) 14b, and a laptop 14c (any one of which may include an identification element 16), a base transceiver station 18, a base station controller 22, and a mobile switching center 24. Communication system 10 additionally includes a wireless local area network (WLAN) 28, a data gateway 30, a gateway general packet radio service (GPRS) support node (GGSN) 34, a public switched telephone network (PSTN)

38, and an internet protocol (IP) network 44. Communication system 10 additionally includes a gateway 50, an authentication, authorization, and accounting (AAA) server 54, a home location register (HLR) 58, and a visitor location register (VLR) 60 that may be included within mobile switching center 24. FIG. 1 may be generally configured or arranged to represent a 2.5 G communication architecture applicable to a Global System for Mobile (GSM) environment in accordance with a particular embodiment of the present invention. However, the 2.5G architecture is offered for purposes of example only and may alternatively be substituted with any suitable networking protocol or arrangement that provides a communicative platform for communication system 10.

According to the teachings of one embodiment of the present invention, communication system 10 operates to offer continued and relatively seamless connectivity to multiple devices that may be used by end user 12. End user 12 is afforded the opportunity to move between access network topologies without having to constantly re-authenticate devices or components that he/she seeks to operate. Furthermore, end user 12 may roam between access technologies without losing or breaking the data or information being received by end user 12. This provides for a potentially seamless handover approach that offers end user 12 considerable flexibility in moving between various access technologies. In some scenarios, re-authentication may be occurring automatically, whereby end user 12 could lose a communication session between access technologies, but reestablish a link through suitable auto-re-authentication protocols.

This flexibility may be achieved by implementing identification element 16 in any selected device that may be operated by end user 12. Identification element 16 allows a single element or device to be used as a common authentication point or node. In addition, a suitable communications protocol may be implemented in all of the devices such that re-authenticating through each individual device being used by end user 12 is not required. The implementation of a single identification element 16 reduces costs for a component manufacturer that may otherwise have to place identification element 16 in every device being used by end user 12. A single identification element 16 positioned in one device also provides the capability for inter-communications between devices, whereby the use of a single identification element 16 in one device operates as a common authentication point allowing all other devices to authenticate through one single device. The identification element and the protocol and physical layer for inter-device communication may be distinct or tied in accordance with particular needs.

End user 12 is a client or customer wishing to initiate a communication or data exchange in communication system 10 via any suitable network. End user 12 may operate to use any suitable device for communications in communication system 10. In addition to the example set of devices illustrated in FIG. 1, end user 12 may also initiate a communication using an electronic notebook, any suitable cellular telephone, a standard telephone, or any other suitable device (that may or may not be wireless), component, element, or object capable of initiating voice or data exchanges within communication system 10. The devices illustrated in FIG. 1 may also be inclusive of any suitable interface to the human user or to a computer, such as a display, microphone, keyboard, or other terminal equipment (such as for example an interface to a personal computer or to a facsimile machine in cases where end user 12 is used as a modem). End user 12 may alternatively be any device or object that seeks to initiate a communication on behalf of another entity or element, such as a program, a database, or any other component, device, element, or object capable of initiating a voice or a data exchange within communication system 10. Data, as used herein in this document, refers to any type of numeric, voice, or script data, or any type of source or object code, or any other suitable information in any appropriate format that may be communicated from one point to another.

Each of the communications devices illustrated in FIG. 1 may include a communications protocol such that devices are provided a platform to communicate with each other. This communications feature allows the devices to authenticate themselves when appropriate, instead of requiring end user 12 to re-authenticate each time he/she/it wishes to initiate a communication. In a particular embodiment of the present invention, this inter-communications feature may be based on Bluetooth technology. Alternatively, any other suitable inter-communications protocol may be implemented in order to allow authentication between devices that may be operated by end user 12. Such inter-communications may include protocols based on infrared technology, tethered cables, specifications based on the IEEE 802.11 standard, or any other suitable communications protocol that allows two or more devices to communicate with each other. Identification element 16 further allows end user 12 to move between access technologies as described in greater detail below with reference to FIG. 2.

Each of the devices illustrated in FIG. 1 may also communicate with each other in order to indicate to end user 12 or to each other that the data being received by a given device may be more adequately displayed on another device. For example, information being received by PDA 14b may be displayed in an enhanced fashion on laptop 14c. Thus, using the inter-communications capability of the devices, laptop 14c may initiate and transmit a signal to end user 12 or to PDA 14b that indicates an enhanced image or an improved data display is capable with use of laptop 14c. This discovering ability allows for optimal viewing or reception of data by any number of devices being used by end user 12. Accordingly, each of the devices being operated by end user 12 may discover capabilities or features of devices or elements within its vicinity. The discovering device may then operate as a control plane, whereby data is communicated through the discovering device to a selected device. Alternatively, the data may be directly received by the optimal device instead of using a control plane such that in the example provided above, laptop 14c would receive data or information directly from IP network 44. It should be noted that not all the devices would have to be owned by end user 12. For example, when in a public area that may have a display device that is network connected, end user 12 may authenticate and use a device to access data provided end user 12 had an appropriate identification element 16.

The devices illustrated in FIG. 1 may also operate to automatically authenticate themselves when any number of selected devices are brought within a common or local area of one device that has been authenticated. Thus, by using the inter-communications feature, a single device (such as mobile station 14a for example) may properly authenticate via a network, whereby PDA 14b and laptop 14c automatically authenticate once they are positioned in the same area as mobile station 14a. This may be achieved by using the inter-communications feature, which allows the devices to communicate with each other.

By way of example, FIG. 1 illustrates identification element 16 as residing within PDA 14b. This example is used only for purposes of teaching, whereby identification element 16 may alternatively be positioned in any other device, such as mobile station 14a, laptop 14c, or any other suitable device operable to initiate a communication session in a network environment. In one embodiment, identification element 16 may only have the function of authenticating other devices, without having significant operational capabilities.

Identification element 16 is a unique identifier that provides a correlation between a source profile and an identity of end user 12. Identification element 16 provides a point of origin designation for a specific request packet propagating through communication system 10. Identification element 16 may be an address element associated with end user 12 in accordance with a particular embodiment of the present invention. However, it is important to note that the authentication mechanism provided in conjunction with identification element 16 may be distinct from addressing, as an address may be assigned before or after authentication. Thus, identification element 16 may be any object, element, or piece of data that operates to uniquely identify or to distinguish end user 12 that generates a request packet in a network environment. For example, identification element 16 may correlate to a user name or to a phone number or to any other piece of information that operates to distinguish participants in a network. Identification element 16 may serve as a temporary identifier where user-IDs are recycled continuously or the user-ID may serve as a permanent identifier where appropriate and stored in a statically or dynamically configured table in accordance with particular needs.

Identification element 16 is a subscriber identification module (SIM) in a particular embodiment of the present invention. The SIM may be included in a single device such as PDA 14b for example, whereby other devices operate to authenticate using the single device inclusive of the SIM. It may be optimal in certain scenarios to position identification element 16 in a device such as mobile station 14a, which provides 'always on' connectivity. Identification element 16 offers great flexibility in that it may be positioned in any suitable location or environment. The SIM may contain an identity of end user 12, where the corresponding code on the SIM and other accompanying mechanisms and suitable elements associated with the SIM may allow end user 12 to communicate securely in a network environment. Accordingly, each time end user 12 initiates a communication, authentication may be executed through the SIM (i.e. identification element 16). The SIM may be positioned in any suitable location to provide a common node for authentication purposes in a network environment. The use of a single SIM provides the ability to utilize various access technologies and offers considerable flexibility in the mobility of end user 12. End user 12 may be permitted to move between access network technologies or topologies while associated devices may continually authenticate. The movement between access technologies is described in greater detail below with reference to FIG. 2.

Base transceiver station 18 is a communicative interface that may comprise radio transmission/reception devices, components or objects, and antennas. Base transceiver station 18 may be coupled to any communications device or element, such as mobile station 14a, PDA 14b, or laptop 14c for example. Base transceiver station 18 may also be coupled to base station controller 22 that uses a landline (such as a high-speed T1/E1 line, for example) interface. Base transceiver station 18 may operate as a series of complex radio modems and may assist in performing a handover execution process where appropriate. Base transceiver station 18 may also perform transcoding and rate adaptation functions in accordance with particular needs.

Base transceiver station 18 may also be coupled to multiple base stations where appropriate, representing radio transmission and reception stations for handling communications traffic. The base stations may be identified as a cell site, primarily so because they hold one or more transmit/ receive cells. Base transceiver station 18 may represent a macro access network utilized by end user 12 (described in greater detail below with reference to FIG. 2). The macro network may be associated with the universal mobile telecommunication service (UMTS), a third generation (3G) communication protocol (inclusive of Node-b architecture) or any other suitable communications protocol.

Base station controller 22 operates as a management component for a radio interface. This management may be executed through remote commands to base transceiver station 18 within communication system 10. Base station controller 22 may manage more than one base transceiver station 18. Some of the responsibilities of base station controller 22 may include management of radio channels in assisting in handover scenarios. Any number of suitable communications objects or elements may be included within, external to, or coupled to base station controller 22 and base transceiver station 18.

Mobile switching center 24 operates as a interface between PSTN 38 and base station controller 22. Mobile switching center 24 represents a location that generally houses communication switches and computers and ensures that its cell sites in a given geographical area are connected. Cell sites refer generally to the transmission and reception equipment or components, potentially including a number of suitable base stations that connect elements such as mobile station 14a, PDA 14b, or laptop 14c to a network, such as IP network 44 for example. By controlling transmission power and radio frequencies, mobile switching center 24 may monitor the movement and the transfer of a wireless communication from one cell to another cell and from one frequency or channel to another frequency or channel. In a given communication environment, communication system 10 may include multiple mobile switching centers 24 that are operable to facilitate communications between base station controller 22 and PSTN 38. Mobile switching center 24 may also generally handle connection, tracking, status, billing information, and other user information for wireless communications in a designated area. This may include, for example, the fact that end user 12 is assigned certain wireless capabilities or use time, most likely based on a given fee schedule associate with a mobile network.

WLAN 28 is a wireless protocol that allows end user 12 to connect to a local network through a wireless or a radio connection. Such a protocol may be generally based on the IEEE 802.11 standard or on any other suitable architecture that provides for wireless communications in a network environment. WLAN 28 as refereed to herein in this document may also be referred to as a 'hot spot' or a public WLAN (PWLAN) where appropriate. WLAN 28 maybe coupled to each of the devices used by end user 12, such as mobile station 14a, PDA 14b, and laptop 14c for example. WLAN 28 may also be coupled to IP network 44 and facilitate authentication procedures for end user 12 by communicating with IP network 44. Suitable encryption protocols may be included within a protocol associated with WLAN 28 where appropriate and according to particular needs.

Data gateway 30 is a communications element that provides access to the internet, intranet, wireless application protocol (WAP) servers, or any other suitable platform, element, or network for communication with a device being used by end user 12. For example, data gateway 30 may be a packet data serving node (PDSN) or, in the case of a GSM environment, data gateway 30 may be serving GPRS support node (SGSN). Data gateway 30 may provide an access gateway for devices implemented by end user 12 and for IP network 44. Data gateway 30 may further provide foreign agent support and packet transport for virtual private networking or for any other suitable networking configuration where appropriate. Data gateway 30 may also assist in authenticating and authorizing end user 12 before being permitted to communicate in communication system 10. Data gateway 30 may be coupled to base station controller 22 and GGSN 34.

GGSN 34 is a communications node operating in a GPRS environment that may be working in conjunction with multiple serving GPRS support nodes (SGSNs), providing a communications medium in a GPRS service network environment in communicating high-speed data exchanges within communication system 10. GGSN 34 may be inclusive of a walled garden or any other suitable mechanism that a network operator may choose to implement that provides some connectivity for the network. GPRS represents a packet-based data bearer service for communication services that may be delivered as a network overlay for any type of suitable network configuration or platform. GPRS generally applies packet-radio and packet switching principles to transfer data packets in an efficient way between global system for mobile communications (GSM) mobile stations and external packet data networks. Packet switching occurs when data is split into packets that are transmitted separately and then reassembled at a receiving end. GPRS may support multiple internet communication protocols, and may enable existing IP, X.25, or any other suitable applications or platforms to operate over GSM connections.

PSTN 38 represents a worldwide telephone system that is operable to conduct communications between two nodes. PSTN 38 may be any landline telephone network operable to facilitate communications between two entities, such as two persons, a person and a computer, two computers, or in any other environment in which data is exchanged for purposes of communication. According to one embodiment of the present invention, PSTN 38 operates in a wireless domain, facilitating data exchanges between end user 12 and some other entity within or external to communication system 10.

IP network 44 is a series of points or nodes of interconnected communication paths for receiving and transmitting packets of information that propagate through communication system 10. IP network 44 offers a communications interface between WLAN 28 and any number of selected components within communication system 10. IP network 44 may be any LAN, metropolitan area network (MAN), or wide area network (WAN), or any other appropriate architectural system that facilitates communications in a network environment. IP network 44 implements a transmission control protocol/internet protocol (TCP/IP) communication language protocol in a particular embodiment of the present invention. However, IP network 44 may alternatively implement any other suitable communications protocol for transmitting and receiving data packets within communication system 10.

Gateway 50 is a network point or node that operates as a data exchange interface between IP network 44 or AAA server 54 and HLR 58. Gateway 50 may also operate as an interface between WLAN 28 and any number of selected components within communication system 10. In certain embodiments, gateway 50 may include suitable conversion elements such as web proxies, content optimization engines, or optimization caches for example, some of which may operate to convert proprietary information into a suitable format to be displayed by a receiving entity or node. In a particular embodiment of the present invention, gateway 50 is a map gateway, such as a transfer point or node, for example. The map gateway operates to correlate an entity of end user 12 to a source profile or end user information within the network. Alternatively, gateway 50 may be any server, router, or element operable to facilitate network communications.

AAA server 54 is an element that operates to facilitate the authentication, authorization, and accounting of end user 12 in a network environment. AAA server 54 is a server program that handles requests by end user 12 for access to networking resources. Networking resources refers to any device, component, or element that provides some functionality to end user 12 communicating in communication system 10. For a corresponding network, AAA server 54 may also provide authentication, authorization, and accounting services and management. Authorization generally refers to the process of giving end user 12 permission to do or to access something. In multi-user computer systems, a system administrator may define for the system, which end users are allowed access to given data in the system and, further, what privileges for end user 12 are provided. Once end user 12 has logged into a network, such as for example IP network 44, the network may wish to identify what resources end user 12 is given during the communication session. Thus, authorization within communication system 10 may be seen as both a preliminary setting up of permissions by a system administrator and the actual checking or verification of the permission values that have been set up when end user 12 is attempting access. Authentication generally refers to the process of determining whether end user 12 is in fact who or what it is declared to be. In the case of private or public computer networks, authentication may be commonly done through the use of unique identification elements or log-on passwords. Knowledge of the password offers a presumption that a given end user is authentic. Accounting generally refers to tracking usage for each end user 12 or each network and may additionally include trafficking information or data relating to other information flows within communication system 10 or within a particular sub-network.

AAA server 54 may receive the IP address or other end user 12 parameters from any suitable source, such as a client aware device or component or a dynamic host configuration protocol (DHCP) server or a domain name system (DNS) database element for example, in order to direct data to be communicated to end user 12. AAA server 54 may include any suitable hardware, software, component, or element that operates to receive data associated with end user 12 and provides corresponding AAA related functions to network components within communication system 10. Authorization and IP address management may be retrieved by AAA server 54 from a layer two tunneling protocol (L2TP) network server (LNS), which may be provided to address secure services for end user 12 where appropriate. The assigned IP address may be a private or a routable IP address. On assignment of the IP address, the DHCP server may perform update procedures for updating the assigned IP address and the leasing parameters for end user 12 in accordance with particular configurations with the network.

In operation, an authentication request may be generated by end user 12 and communicated from a selected device to WLAN 28. The request goes over the network in order to access AAA server 54. AAA server 54 may then query gateway 50, whereby gateway 50 translates that information into a suitable request (such as a map request for example), which gets communicated to HLR 58. HLR 58 may execute the authentication and determine what services will be offered to end user 12. HLR 58 may also determine billing information or communicate billing information to a next destination, such as AAA server 54 or a suitable database, for example. The authentication data may then be passed back through IP network 44 and then to WLAN 28, which may in turn communicate the authentication back to PDA 14b for example. The authentication may be communicated back to the individual device that included identification element 16 or alternatively, the authentication information may be communicated to any suitable element or component within communication system 10.

HLR 58 represents a storage unit or database of subscriber information relevant to communication services. HLR 58 may store or otherwise maintain information related to parameters associated with end user 12 and may further be potentially independent of the physical location of the subscriber, client, or end user 12. HLR 58 may also include information related to the current location of end user 12 for incoming call-routing purposes. HLR 58 may be coupled to gateway 50 and VLR 60 and provide data relating to the capabilities or the services offered to end user 12 generally based on some potential payment scheme. A functional subdivision of HLR 58 may include an authentication center (AuC), the role of which may be the management of security data for the authentication of multiple end users 12 for example.

VLR 60 is a storage element or database that contains dynamic information about capabilities offered to end user 12. In addition, VLR 60 may include information relating to preferences associated with end user 12. VLR 60 and HLR 58 may communicate with each in order to provide mobility to devices being implemented by end user 12. VLR 60 may be included within MSC 24 or within any other suitable device, or alternatively configured to be its own separate entity where appropriate. VLR 60 may further include a copy of data stored in HLR 58. Any suitable user profile information may be contained within VLR 60 and the data stored in VLR 60 may be transferred or otherwise communicated to HLR 58, PSTN 38, or base station controller 22 where appropriate.

In accordance with an example implementation, communication system 10 may be initiated by end user 12 communicating in a WLAN environment for example, whereby end user 12 activates data access by initiating dial-up software that requests a user-ID and/or password. (It is possible that network-initiated communication protocols may be established, whereby the location and display capabilities of end user 12 are discovered and information is sent to any suitable next destination.) A device being used by end user 12 may communicate a signal, via Bluetooth or any other suitable communications technology, to identification element 16 in order to retrieve information associated with an identity of end user 12. The information included within identification element 16 may then be communicated over a WLAN infrastructure to AAA server 54, which communicates with HLR 58 and VLR 60 (via gateway 50) in order to authenticate end user 12.

End user 12 may be properly authenticated by the user-ID and password accessed by AAA server 54. This represents a potential second stage in the authentication process, whereby security policies may be negotiated after authentication has been executed. Once completed, end user 12 may be able to move between a WLAN environment and an Ethernet environment, or a GPRS environment with suitable handover or handoff protocols executed in a transparent fashion.

When end user 12 roams or moves out of a WLAN coverage area and into an Ethernet coverage area, a handover or handoff signaling between the device and an additional device may be initiated. In accordance with the teachings of the present invention, a re-authentication during the handover is effectively avoided. Authentication element 16, the user-ID, a password, and/or any other suitable information may be coupled during the communication session for security purposes. There is generally no need for continual re-authentication techniques to be implemented for multiple devices because an access network has already executed this function when end user 12 roamed into a corresponding coverage area. Thus, access may be gained to data services on a network through a single device, whereby identification element 16 provides for a common point or node. This is a result of the implementation of a communications protocol that provides for a suitable data transfer between devices associated with end user 12 and the device inclusive of identification element 16.

In another example operation of communication system 10, identification element 16 may be positioned in mobile station 14a. Mobile station 14a may provide an 'always on' connection to any suitable network or communication interface and thus such a positioning may be optimal in certain scenarios in accordance with particular needs. Identification element 16 may have already been authenticated by HLR 58, whereby an HLR record associated with end user 12 is found in VLR 60. AAA server 54 may then request information associated with the identification or the password of end user 12, without the need for identification element 16 to resend or retransmit its authentication data. AAA server 54 may then retain authentication data for end user 12 from HLR 58 and VLR 60, as well as potentially its own associated data base, which may store the ID and password associated with end user 12. Such storage may be in addition to information pertaining to the location of end user 12 as he/she roams from one location to another. Any number of other suitable communications protocols and approaches may be implemented in conjunction with one or more devices to be used by end user 12 and identification element 16; the previous two examples have only been offered for purposes of teaching and example and should not be construed to limit other potential operations of communication system 10.

Figure 2:
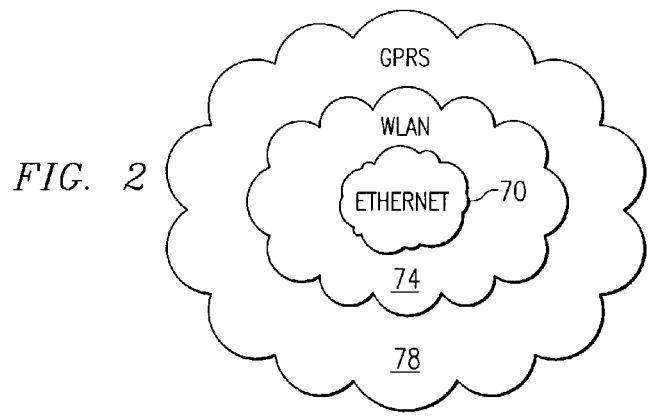
FIG. 2 is a simplified logic diagram illustrating an example of multiple access networks.

FIG. 2 is a logic diagram illustrating multiple access technologies in accordance with one embodiment of the present invention. These access technologies are only offered for purposes for teaching and should not be construed to limit any other suitable access technology that may be provided to end user 12. FIG. 2 illustrates multiple access networks, including an Ethernet network 70, a WLAN network 74, and a GPRS network 78. In accordance with the teachings of the present invention, end user 12 may move between each of these networks while maintaining connectivity seamlessly and transparently transitioning between networks.

Ethernet network 70 represents a high-speed network, offering a 100-megabit connection to any suitable location such as an office or residence for example. WLAN network 74 represents a somewhat smaller network, offering an 11-megabit connectivity platform, whereby the coverage provided by WLAN network 74 is somewhat broader. GPRS network 78 represents a network providing broad coverage and may be referred to as a macro network. Because of the nature of GPRS technology, throughputs may be in a 9.6 to 40 megabit range depending on the limitations of individual devices and the amount of users on the network. These networking speed parameters as well as their corresponding technologies (Ethernet, WLAN, GPRS) are only offered for purposes of teaching and therefore may be substituted with any other suitable communications protocol, platform, architecture, or arrangement where appropriate and according to particular needs.

End user 12 may be permitted to move between access technologies while maintaining access or connectivity to the network. Positioning identification element 16 in a single device allows end user 12 to be authenticated regardless of the access technology to which it is connected. Authentication may be executed through a common access technology, whereby all billing information may be combined together.

In operation of an example scenario, end user 12 may travel in an airport and walk outside the airport where the access technology changes from WLAN network 74 to GPRS network 78. In accordance with the teachings of the present invention, a connection is maintained via proper authentication, and using mobile IP parameters where appropriate. Authentication may be performed concurrently amongst multiple devices where a seamless handoff takes place by using identification element 16 that authenticates all devices. Accordingly, a single device, such as PDA 14*b* for example, may be used to authenticate all other devices to be used by end user 12 as roaming occurs.

This mobility feature provides a 'nomadicity' element to communication system 10. This may allow end user 12 to move from location to location, connecting to a network and gaining access to a home network. In the example above, end user 12 may begin in Ethernet network 70 and move into a WLAN environment or WLAN network 74. This transition may be performed by using a suitable handoff or handover, whereby the communication path is re-authenticated in a seamless fashion using mobile IP functions and Bluetooth communications/signaling between the first and second devices to establish connectivity from an IP networking perspective. End user 12 may then move into a macro system, such as GPRS network 78 and continue to maintain suitable connectivity in a similar fashion.

Preferences for access networks, such as those illustrated in FIG. 2, may be configured or otherwise setup in each of the devices accessible by end user 12. Accordingly, a suitable protocol may be implemented such that end user 12 designates a first choice access technology, such as Ethernet for example. Thus, all communications involving end user 12 with a selected device may default to that predefined access technology. In addition, each of the devices illustrated in FIG. 1 may include suitable mechanisms that facilitate communications in Ethernet, GPRS, and WLAN environments, with appropriate networking cards that facilitate such communications. Alternatively, these preferences may be stored in AAA server 54, IP network 44, or in any suitable place within or external to communication system 10.

FIG. 3 is a flowchart illustrating a series of steps associated with a method for providing access to a network in a communications environment. The method begins at step 100 where identification element 16 may be positioned in a first device that is operable to be used by end user 12. Both the first and second devices as described herein with reference to FIG. 3 may be any of the elements illustrated in FIG. 1 such as mobile station 14*a*, PDA 14*b*, laptop 14*c*, or any other suitable device, component, or element that seeks access to a network.

At step 104, a communication is initiated with a second device operable to be used by end user 12. A communications protocol or link may then be established between the first and second devices as illustrated in step 106. The protocol may be based on infrared technology, Bluetooth, or any other suitable communications protocol or architecture. The communication by the first device to the second device may be executed automatically where appropriate in response to the second device being positioned in a local area shared by both devices. At step 108 the first device may access IP network 44 in order to properly authenticate end user 12. Identification element 16 is used to authenticate end user 12 through the second device such that end user 12 may now operate either device in multiple access networks, such as Ethernet, WLAN, GPRS, or any other suitable communications architecture or platform. Some of the steps illustrated in FIG. 3 may be changed or deleted where appropriate and additional steps may also be added to the flowchart. These changes may be based on specific communications architectures or particular device configurations and do not depart from the scope or the teachings of the present invention.

The present invention may be used in a host of communication environments, such as in conjunction with time division multiple access (TDMA), for example. In such an access scheme, end users 12 are multiplexed over the time domain, i.e. user U1 uses radio frequency F1 for time period T1 after which user U2 uses the same frequency F1 for time T1 and so on. The time axis is divided into equal length time slots. In TDMA, each user occupies a cyclically repeating time slot defining a channel; N time slots make up a frame. In using TDMA it is possible to allocate different numbers of time slots per frame to different end users. Thus bandwidth can be supplied on demand to different users depending on user needs. The GSM and the IS-54/IS-136 (based on United States digital cellular (USDC) system) are some of the standards that may use TDMA in conjunction with the present invention.

Frequency division multiple access (FDMA) represents another communications environment in which communication system 10 may be employed. The FDMA system assigns individual frequency channels or bands to individual users wherein all users may transmit at the same time. These channels are assigned on demand to users requesting service. During the call no other user can share the same frequency band. An FDMA channel carries only one communications exchange, e.g. phone call at a time. After the assignment of a voice or data channel, a mobile station and multiple or various base stations transmit simultaneously and continuously. Multiple or various base stations that are used in conjunction with an FDMA system may implement duplexers because both the transmitter and receiver operate at the same time. The advanced mobile phone service (AMPS) and the European total access communication system (ETACS) are some of the standards that may use FDMA in conjunction with the access approach of the present invention.

Code division multiple access (CDMA) represents another environment in which communication system 10 may be used in conjunction with the disclosed access execution approach. All users in the CDMA system may use the same carrier frequency and may transmit simultaneously. Each end user 12 may have his own pseudo-random code word. Whenever a mobile station or multiple various base stations using CDMA wish to transmit, the system may correlate the message signal with the code word. The receiver may perform decorrelation on the received signal. For detection of the message signal, the receiver identifies the code word used by the transmitter. Because many users of the CDMA system share the same frequency, CDMA systems could benefit from the teachings of the present invention in shortening handover execution times. IS-95 illustrates one example of a communications protocol that may use the CDMA scheme in conjunction with the present invention.

Although the present invention has been described in detail with reference to particular embodiments illustrated in FIGS. 1 and 2, it should be understood that various other changes, substitutions, and alterations may be made hereto without departing from the spirit and scope of the present invention. For example, although the present invention has been described as operating in a PSTN environment, the present invention may be used in any communications environment where a handoff or a handover is appropriate. In addition, communications system 10 may be used in any environment where multiple devices associated with end user 12 are sought to be authenticated using a network.

Additionally, although the present invention has been described with reference to identification element 16 or a SIM, the unique identification feature as described herein may be any suitable object that distinguishes one end user 12 from another. Moreover, such an identification feature may reside in any suitable location within or external to communications system 10. Any number of devices, components or elements (such as IP network 44 for example) may be capable of holding or maintaining the identity or user profile data such that end user 12 may be properly authenticated in an efficient manner.

Numerous other changes, substitutions, variations, alterations, and modifications may be ascertained by those skilled in the art and it is intended that the present invention encompass all such changes, substitutions, variations, alterations, and modifications as falling within the spirit and scope of the appended claims.

Moreover, the present invention is not intended to be limited in any way by any statement in the specification that is not otherwise reflected in the appended claims. Various example embodiments have been shown and described, but the present invention is not limited to the embodiments offered. Accordingly, the scope of the present invention is intended to be limited solely by the scope of the claims that follow.

What is claimed is:

1. A method for authenticating an end user in a network environment comprising:

positioning an identification element in a first device that is configured to provide an interface for an end user, wherein the first device is further configured to communicate with an internet protocol (IP) network and with a second device whereby the first and second devices achieve synchronization with each other, and whereby data propagate between the first and second devices;

authenticating the end user with a selected one of the first and second devices through the IP network using the identification element such that the end user operate the first and second devices in multiple access networks that cooperate to provide connectivity to the end user, each of the access networks operable to facilitate communications between the end user and the IP network; and configuring each of the first and second devices to designate a preference for a selected one of the access networks, wherein the preference is invoked as a default for the end user unless another one of the access networks is selected by the end user.

2. The method claim 1, further comprising:

implementing a communications protocol in each of the first and second devices such that they can communicate with each other; and communicating, by the first device, to the second device such that the second device is authenticated through the IP network using the identification element.

3. The method of claim 2, wherein the communication by the first device to the second device is executed automatically in response to the second device being positioned in a local area shared by the first and second devices.

4. The method of claim 2, wherein the communications protocol implemented in the first and second devices is secure such that data intended for the end user is received by a selected one of the devices.

5. The method of claim 2, further comprising:

communicating, by the second device, to a selected one of the first device and the end user that the second device is capable of displaying data being received by the first device in an enhanced format.

6. The method of claim 1, further comprising:

invoking an authentication, authorization, and accounting (AAA) server in order to authenticate the end user.

7. The method of claim 1, wherein the identification element is a subscriber identification module (SIM), and wherein the access network that provides connectivity to the end user is selected from the group consisting of an Ethernet network; a wireless local area network (WLAN); and a general packet radio service (GPRS) network.

8. A system for authenticating an end user in a network environment comprising:

means for positioning an identification element in a first device that is configured to provide an interface for an end user, wherein the first device is further configured to communicate with an internet protocol (IP) network and with a second device, whereby the first and second devices achieve synchronization with each other, and whereby data propagate between the first and second devices;

means for authenticating the end user with a selected one of the first and second devices through the IP network using the identification element such that the end user operate the first and second devices in multiple access networks that cooperate to provide connectivity to the end user, each of the access networks operable to facilitate communications between the end user and the IP network; and means for configuring each of the first and second devices to designate a preference for a selected one of the access networks, wherein the preference is invoked as a default for the end user unless another one of the access networks is selected by the end user.

9. The system claim 8, further comprising:

means for implementing a communications protocol in each of the first and second devices such that they can communicate with each other; and means for communicating to the second device such that the second device is authenticated through the IP network using the identification element.

10. The system of claim 9, wherein the communication to the second device is executed automatically in response to the second device being positioned in a local area shared by the first and second devices.

11. The system of claim 9, wherein the communications protocol implemented in the first and second devices is secure such that data intended for the end user is received by a selected one of the devices.

12. The system of claim 9, further comprising:
means for communicating to a selected one of the first device and the end user that the second device is capable of displaying data being received by the first device in an enhanced format.

13. The system of claim 8, further comprising:
means for invoking an authentication, authorization, and accounting (AAA) server in order to authenticate the end user.

14. The system of claim 8, wherein the identification element is a subscriber identification module (SIM), and wherein the access network that provides connectivity to the end user is selected from the group consisting of an Ethernet network; a wireless local area network (WLAN); and a general packet radio service (GPRS) network.

15. A computer readable medium having code for authenticating an end user in a network environment, the code configured to:
position an identification element in a first device that is configured to provide an interface for an end user, wherein the first device is further configured to communicate with an internet protocol (IP) network and with a second device whereby the first and second devices achieve synchronization with each other and whereby data propagate between the first and second devices;
authenticate the end user with a selected one of the first and second devices through the IP network using the identification element such that the end user operate the first and second devices in multiple access networks that cooperate to provide connectivity to the end user, each of the access networks operable to facilitate communications between the end user and the IP network; and
configure each of the first and second devices to designate a preference for a selected one of the access networks, wherein the preference is invoked as a default for the end user unless another one of the access networks is selected by the end user.

16. The code of claim 15, further operable to:
implement a communications protocol in each of the first and second devices such that they can communicate with each other; and
communicate to the second device such that the second device is authenticated through the IP network using the identification element.

17. The code of claim 16, wherein the communication to the second device is executed automatically in response to the second device being positioned in a local area shared by the first and second devices.

18. The code of claim 16, wherein the communications protocol implemented in the first and second devices is secure such that data intended for the end user is received by a selected one of the devices.

19. The code of claim 16, further operable to:
communicate to a selected one of the first device and the end user that the second device is capable of displaying data being received by the first device in an enhanced format.

20. The code of claim 15, further operable to:
invoke an authentication, authorization, and accounting (AAA) server in order to authenticate the end user.

21. The code of claim 15, wherein the identification element is a subscriber identification module (SIM), and wherein the access network that provides connectivity to the end user is selected from the group consisting of an Ethernet network; a wireless local area network (WLAN); and a general packet radio service (GPRS) network.

22. An apparatus for authenticating an end user in a network environment comprising:
a first device having an identification element, the first device being configured to provide an interface for an end user, the first device being further configured to communicate with an internet protocol (IP) network and with a second device, whereby the first and second devices achieve synchronization with each other, and whereby data propagate between the first and second devices, wherein the end user may be authenticated with a selected one of the first and second devices through the IP network using the identification element such that the end user operate the first and second devices in multiple access networks that cooperate to provide connectivity to the end user, each of the access networks operable to facilitate communications between the end user and the IP network, wherein each of the first and second devices may be configured to designate a preference for a selected one of the access networks, and wherein the preference is invoked as a default for the end user unless another one of the access networks is selected by the end user.

23. The apparatus of claim 22, further comprising:
a communications protocol wherein the first device is operable to implement such that the first device can communicate with the second device, wherein the first device may communicate with the second device such that the second device is authenticated through the IP network using the identification element.

24. The apparatus of claim 23, wherein the communication by the first device to the second device is executed automatically in response to the second device being positioned in a local area shared by the first and second devices.

25. The apparatus of claim 23, wherein the communications protocol implemented in the first and second devices is secure such that data intended for the end user is received by a selected one of the devices.

26. The apparatus of claim 23, wherein the first device is operable to receive a signal from the second device that indicates that the second device is capable of displaying data being received by the first device in an enhanced format.

27. The apparatus of claim 22, further comprising:
an authentication, authorization, and accounting (AAA) server operable to be accessed by the first device in order to authenticate the end user.

28. The apparatus of claim 22, wherein the identification element is a subscriber identification module (SIM), and wherein the access network that provides connectivity to the end user is selected from the group consisting of an Ethernet network; a wireless local area network (WLAN); and a general packet radio service (GPRS) network.

* * * * *